July 15, 1969  C. Y. FERRIS, JR  3,455,072
MAUSOLEUM
Filed May 27, 1968  2 Sheets-Sheet 1
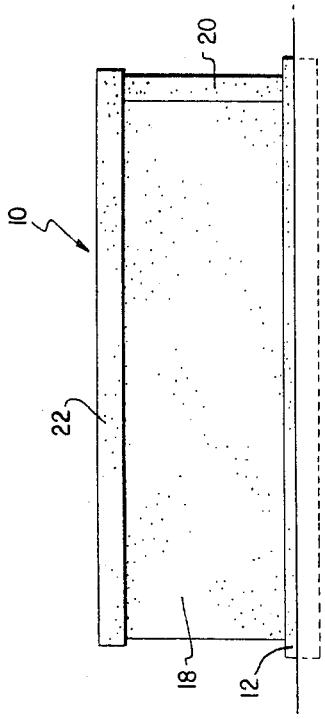
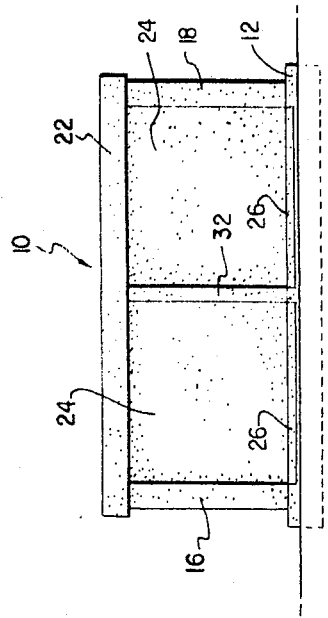
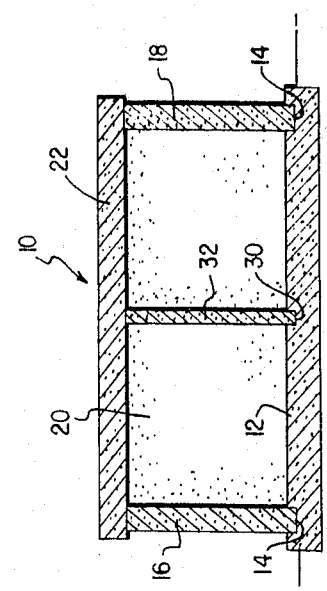
INVENTOR
CYRUS Y. FERRIS, JR.
BY Diggins and O'Boyle
ATTORNEYS July 15, 1969  C. Y. FERRIS, JR  3,455,072
MAUSOLEUM
Filed May 27, 1968  2 Sheets-Sheet 2
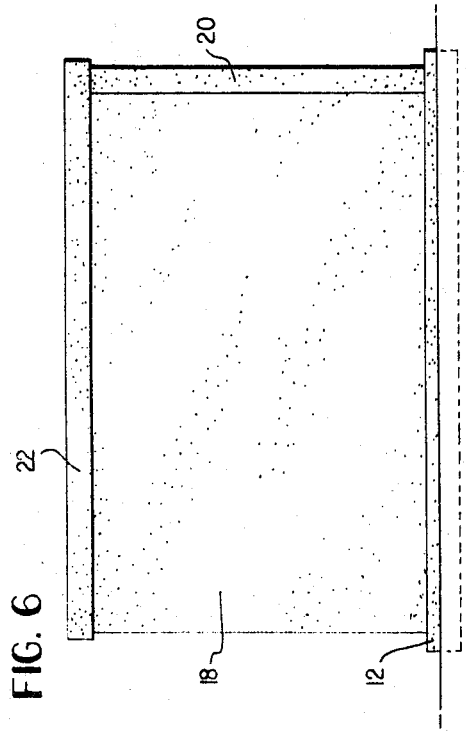
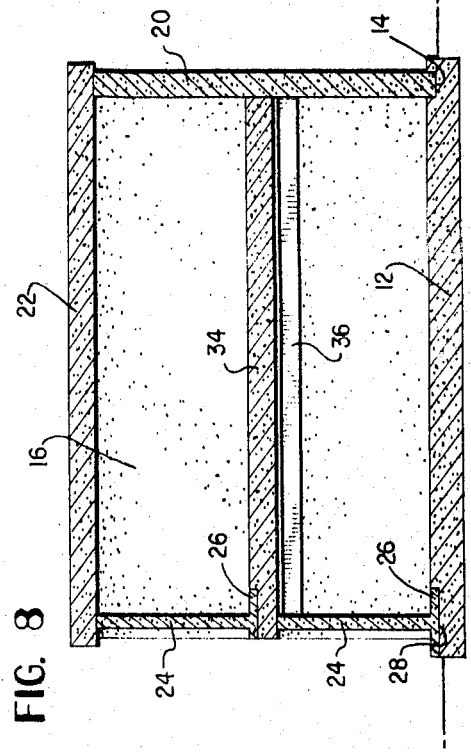
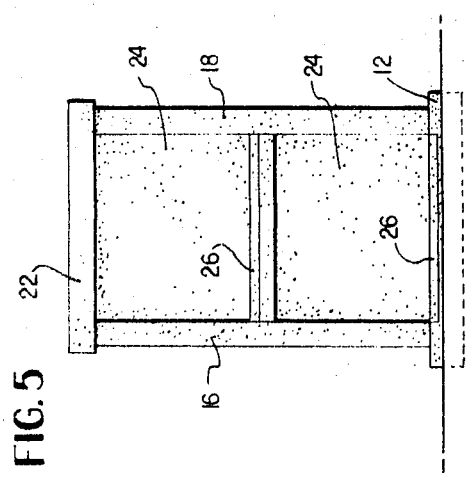
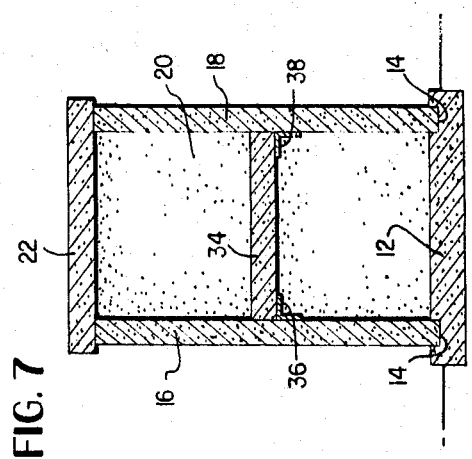
INVENTOR
CYRUS Y. FERRIS, JR.
BY  Diggins and O'Boyle
ATTORNEYS 3,455,072
MAUSOLEUM
Cyrus Y. Ferris, Jr., Montpelier, Vt., assignor to Rock of Ages, Barre, Vt., a corporation of Vermont
Continuation-in-part of application Ser. No. 497,837, Oct. 19, 1965. This application May 27, 1968, Ser. No. 732,805
Int. Cl. E04h 13/00; E04c 1/04
U.S. Cl. 52—134                      1 Claim

ABSTRACT OF THE DISCLOSURE

A granite mausoleum comprised of a plurality of granite members adhesively bonded together at the corners of the mausoleum by an epoxy resin containing an admixture of a filler material therein, compounded such that the joint of epoxy-filler, when cured, has a linear coefficient of expansion substantially equal to that of granite.

---

This application is a continuation-in-part of U.S. application S.N. 497,837 filed Oct. 19, 1965, and now abandoned.

This invention relates to mausoleums, and more particularly to an improved granite mausoleum ready for immediate placement in a cemetery, wherein the joints of the prefabricated mausoleum are formed of an epoxy cement and filler compounded to yield bonded joints having a coefficient of expansion (linear) substantially equal to granite.

While there has always been a large mass of people who prefer interment above ground, the many disadvantages inherent in the mausoleums of the prior art has deterred many of these people from purchasing mausoleums.

Previously it has always been necessary for a mausoleum to be erected at its permanent site in the cemetery. The mausoleum was delivered to the site in pieces, which then had to be assembled. Erection of the mausoleum required the availability of qualified workmen for pouring the footings and preparing a proper concrete base, as well as assembling the various pieces of granite together through the use of dowels and mortarized joints.

It was often very difficult to obtain qualified workmen locally for erecting the mausoleum and as a result in many instances an improperly prepared foundation resulted in settling and the destruction of the structure within a relatively few years.

With the mausoleums of the prior art one not only had to contend with the initial expenditure of purchasing and erecting the mausoleum, but he also had to make provisions for the maintenance of the mausoleum.

The many mortar joints of previous mausoleums not only required continued repointing, but also served as a means for seepage of moisture into the mausoleum and moisture staining of the mausoleum itself.

It is an object of the present invention to provide a mausoleum which overcomes all the disadvantages of the prior art and places private, above-ground interment within the financial reach of many people who otherwise could not afford it.

It is an object of the present invention to provide a mausoleum which is pre-assembled in a factory and can be lifted directly from a truck onto a site in a cemetery.

It is an object of the present invention to provide a mausoleum made of pre-assembled granite, the joints of which are bonded together with a permanent waterproof seal of epoxy cement and filler compounded to yield a joint that has a coefficient substantially equal to granite.

It is an object of the present invention to provide a factory pre-assembled granite mausoleum in which the carefully matched granite parts are joined by a bonding process which creates a joint so strong that the granite itself would break before the bond would fail.

It is an object of the present invention to provide a factory pre-assembled granite mausoleum bonded together by an agent, free of dowels or other anchoring devices.

It is an object of the present invention to provide a factory pre-assembled granite mausoleum wherein the bond joining the pieces of granite is so strong as to provide the effect of angle irons making possible the use of thinner pieces of granite than would be necessary in the ordinary mausoleum.

Other details, objects and advantages of the present invention will become apparent from the following description thereof, taken in conjunction with the drawings which accompany and form part of the specification.

In the drawings:

FIGURE 1 shows a front elevation of an embodiment of the present invention containing two crypts, side by side;

FIGURE 2 shows a side view of the present invention as illustrated in FIG. 1;

FIGURE 3 shows a transverse section of the present invention as illustrated in FIG. 1;

FIGURE 4 shows a longitudinal section of the present invention as illustrated in FIG. 1;

FIGURE 5 shows a front elevation of an embodiment of the invention containing two crypts, one over the other;

FIGURE 6 shows a side view of the present invention as illustrated in FIG. 5;

FIGURE 7 shows a transverse section of the present invention as illustrated in FIG. 5; and FIGURE 8 shows a longitudinal section of the present invention as illustrated in FIG. 5.

Referring to the drawings, the mausoleum 10 is provided with a base member 12 of granite. This base member is provided with a groove or channel 14 in its upper face which extends along the sides and rear of the base member.

Received into this groove are vertical granite members 16, 18, and 20, forming the sides and rear of said mausoleum. The top of the mausoleum is formed by a horizontal granite member 22 which is supported by the top edges of said vertical members.

The front of the mausoleum is provided with a granite face plate 24 mounted on a horizontal member 26 of granite which is received in the recess 28 provided along the upper face of base member 12.

The vertical members 16, 18, and 20, the base member 12 and the horizontal member 22 are all sealed together at the factory with a bonding agent having as nearly as possible the same coefficient of expansion as that of granite thus providing a seal which is not only impervious to water but is not subjected to shear stresses which would otherwise tend to crack the seals.

The bonding agent consists of an epoxy resin and a filler having a low coefficient of thermal expansion so as to offset the high coefficient of thermal expansion of the resin.

While the face member 24 of the mausoleum is shipped in place with the mausoleum it is not attached thereto permanently. The face member 24 is made removable so that after the mausoleum is placed in the cemetery and is ready for occupancy, the face member 24 can be removed and the casket inserted in the mausoleum. After the casket is inserted into the mausoleum, the face member is then put back in place and set with a regular setting compound so that it can be removed by simply taking out the setting compound if the need should ever arise.

In order to insure against deterioration of the bonding agent, the bonding agent is made opaque so that the ultraviolet rays of the sun do not have an adverse effect upon it.

The seal thus provided between the granite members is actually stronger than the granite itself, thus the unitized construction creates a structure that is immune to damage from frostheaves, sinkage, earth tremors or similar hazards.

The strength of the bond is so great that it serves the function of making possible the use of thinner pieces of granite than would be necessary in the ordinary mausoleum.

For illustrative purposes, two embodiments of the invention are shown. In the first embodiment, the mausoleum provides two crypts, side by side. In the second embodiment the crypts are positioned one of top of the other.

With the crypts side by side as shown in FIGURE 1, the base member 12 is provided with a groove 30 for receiving a vertical granite member 32 which divides the mausoleum into two crypts.

In the other embodiment shown in FIGURE 5, a horizontal member 34 bound to vertical members 18 and 20, and supported by two stainless steel angle arms, divides the mausoleum into two crypts.

It is obvious that the invention may be made in other forms providing for a plurality of crypts.

While a mausoleum constructed in accordance with the present invention can be set directly on the ground, in areas of reasonably well drained terrain, the earth should be removed to a level below normal frost depth and filled with gravel to within four to five inches grade. The mausoleum can then be set directly on the gravel. In the event frost heaving is encountered no damage will result as the unit will settle back to its original position as soon as the frost leaves the ground.

With my present invention, I thus provide a factory preassembled mausoleum ready for positioning in a cemetery, which not only eliminates the high expenses formally associated with erecting the mausoleum but eliminates the expense normally incurred in maintaining the mausoleum.

Granite has a thermal coefficient of expansion (linear) of approximately $8.3 \times 10^{-6}$ as shown on page 2241 of the Handbook of Chemistry and Physics, forty-first edition, 1959–60, published by the Chemical Rubber Publishing Company. The Handbook of Chemistry and Physics also shows on page 1547 that thermosetting epoxy resins have thermal coefficients of expansion (linear) varying from 3 to $9 \times 10^{-5}$ degrees centigrade.

The Handbook of Chemistry and Physics shows on page 2245 that $Al_2O_3$ has a coefficient of thermal expansion (linear) of approximately $8.7 \times 10^{-6}$ and carbon (gas) has a coefficient of $5.4 \times 10^{-6}$ (page 2240).

Patent 2,528,933 to Wiles and assigned to Shell Development Company is herewith incorporated by reference. This patent discloses the addition of from 25 to 200 percent alumina or other fillers to epoxy resins such as Shell Epon 815, as a filler therefor. (Column 4, line 1–2.) Other typical additives or fillers are shown in columns 8 and 9.

An article entitled Development of a High Temperature Epoxy Casting Compound, that appeared in "Insulation," July 1961, pages 33–37 is herewith incorporated by reference.

EXAMPLE

In order to make a suitable bonding agent for a prefabricated granite mausoleum, according to the invention, one may mix 16 lbs. of Shell Epon 815 resin with approximately 4.15 lbs. of a commercially available filler such as Bentone 27 in a manner set forth in U.S. Patent 2,528,933, together with 1.75 teaspoons of lampblack (coloring agent) for approximately one hour.

Thereafter approximtaely 2.08 lbs. of a commercially available hardening agent such as tetraethylene pentamine is added and stirred for about 12 minutes. This cementatious mixture is used to bond two sections of granite and produces a bond having a coefficient of expansion substantially equal to the granite R so as to form a waterproof joint that has superior strength and does not crack, weather or need point up regardless of ordinary thermal stress of outdoor exposure resulting from exposure to the severest winters or hottest summers.

While I have shown preferred embodiments of my invention it is to be understood that various changes may be made by those skilled in the art.

Having thus described my invention, what I claim to secure by Letters Patent is:

1. A factory pre-assembled mausoleum comprising a granite base member impenetrable by water having a channel in its upper face extending along its sides and rear, a number of vertical granite members received into said channel forming the sides and rear of said mausoleum, a horizontal granite member supported by the top edges of said vertical members forming the top of said mausoleum and a removable face plate means forming the front of said mausoleum, wherein a substantial number of the joints formed by the aforesaid members are permanently joined by an epoxy resin and from 25 to 200% by weight of a filler so that the said joints have coefficient of thermal expansion substantially equal to that of granite.

References Cited

UNITED STATES PATENTS

| | | | |
|---|---|---|---|
| 1,124,065 | 1/1915 | Savidge | 52—140 X |
| 1,342,812 | 6/1920 | Hughes et al. | 52—132 |
| 1,752,572 | 4/1930 | Person | 52—134 |
| 2,528,933 | 11/1950 | Wiles. | |
| 2,951,001 | 8/1960 | Rubenstein | 52—309 |
| 3,228,155 | 1/1966 | Biesanz et al. | 52—309 |
| 3,287,865 | 11/1966 | Lockman | 52—136 |

FOREIGN PATENTS

| | | |
|---|---|---|
| 206,156 | 11/1959 | Austria. |

HENRY C. SUTHERLAND, Primary Examiner

P. C. FAW, JR., Assistant Examiner

U.S. Cl. X.R.

52—136, 139, 309